United States Patent
Carlson et al.

(10) Patent No.: US 7,617,449 B2
(45) Date of Patent: Nov. 10, 2009

(54) METHOD AND SYSTEM FOR MAPPING CONTENT BETWEEN A STARTING TEMPLATE AND A TARGET TEMPLATE

(75) Inventors: John Thomas Carlson, Seattle, WA (US); Robert M. Dolin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 10/857,607

(22) Filed: May 28, 2004

(65) Prior Publication Data

US 2005/0268227 A1    Dec. 1, 2005

(51) Int. Cl.
*G06F 17/00* (2006.01)
(52) U.S. Cl. .................. 715/243; 715/234; 715/235; 715/255; 715/273
(58) Field of Classification Search ................. 715/517, 715/513, 526, 530, 234, 235, 243, 255, 273
See application file for complete search history.

(56) References Cited

U.S. PATENT DOCUMENTS

| | | | | |
|---|---|---|---|---|
| 5,680,629 | A | | 10/1997 | Slayden et al. ............... 395/789 |
| 5,895,476 | A | * | 4/1999 | Orr et al. .................... 715/517 |
| 5,895,477 | A | * | 4/1999 | Orr et al. .................... 715/517 |
| 5,903,902 | A | * | 5/1999 | Orr et al. .................... 715/517 |
| 5,903,905 | A | | 5/1999 | Andersen et al. ............. 707/526 |
| 5,956,737 | A | * | 9/1999 | King et al. .................. 715/517 |
| 6,055,522 | A | * | 4/2000 | Krishna et al. ............... 715/517 |
| 6,173,286 | B1 | | 1/2001 | Guttman ..................... 707/100 |
| 6,313,824 | B1 | | 11/2001 | Meisner et al. ............. 345/150 |
| 6,499,041 | B1 | * | 12/2002 | Breslau et al. .............. 715/210 |
| 6,616,702 | B1 | | 9/2003 | Tonkin ....................... 715/515 |
| 6,823,495 | B1 | * | 11/2004 | Vedula et al. ............... 715/805 |
| 6,941,511 | B1 | * | 9/2005 | Hind et al. .................. 715/523 |
| 7,085,998 | B2 | * | 8/2006 | Kofman et al. ............. 715/235 |
| 2002/0076120 | A1 | * | 6/2002 | Loce et al. .................. 382/300 |
| 2003/0217069 | A1 | * | 11/2003 | Fagin et al. ................. 707/102 |
| 2004/0019850 | A1 | | 1/2004 | Purvis ........................ 715/253 |

(Continued)

FOREIGN PATENT DOCUMENTS

WO    WO 01/29695    4/2001

(Continued)

OTHER PUBLICATIONS

Velegrakis, Yannis, et al., Mapping Adaptation under Evolving Schemas, Proceedings of the 29$^{th}$ VLDB Conference, Berlin, Germany, 2003, pp. 1-12.*

(Continued)

*Primary Examiner*—Rachna S Desai
(74) *Attorney, Agent, or Firm*—Merchant & Gould; Ryan T. Grace

(57) ABSTRACT

Methods and systems are provided for mapping content from a first or starting template to a second or target template. An analysis is performed of any content objects and content placeholders contained in the starting and target templates. One or more potential content mappings are generated for potentially mapping content objects from the starting template to the target template. An optimal mapping is selected from the potential mappings, and content objects from the starting template are mapped to the target template according to the selected optimal mapping.

15 Claims, 7 Drawing Sheets

U.S. PATENT DOCUMENTS

| | | | |
|---|---|---|---|
| 2004/0205452 A1* | 10/2004 | Fitzsimons et al. | 715/500 |
| 2004/0205467 A1* | 10/2004 | Kofman et al. | 715/500 |
| 2004/0205591 A1* | 10/2004 | Nagao | 715/513 |
| 2005/0015732 A1* | 1/2005 | Vedula et al. | 715/805 |
| 2005/0210374 A1* | 9/2005 | Lander | 715/513 |
| 2006/0101333 A1* | 5/2006 | Collie et al. | 715/513 |
| 2007/0028165 A1* | 2/2007 | Cole | 715/517 |
| 2007/0112843 A1* | 5/2007 | Swamy et al. | 707/102 |

FOREIGN PATENT DOCUMENTS

| | | |
|---|---|---|
| WO | WO 01/65399 A | 9/2001 |

OTHER PUBLICATIONS

European Search Report re: Application No. 05103914.7-1527 mailed Feb. 5, 2008.

* cited by examiner

METHOD AND SYSTEM FOR MAPPING CONTENT BETWEEN A STARTING TEMPLATE AND A TARGET TEMPLATE

FIELD OF THE INVENTION

The present invention generally relates to presentation of content in a computer-generated template. More particularly, the present invention relates to mapping content between a starting template and a target template.

BACKGROUND OF THE INVENTION

With the advent of the computer age, computer and software users have grown accustomed to user-friendly software applications that help them write, calculate, organize, prepare presentations, send and receive electronic mail, make music, and the like. Modem word processing applications, for example, allow users to create and edit a variety of useful documents. Modem desktop publishing applications, for another example, allow users to create a variety of useful documents and presentations such as newspapers, newsletters, brochures, advertisement layouts, stationery, and the like.

Some software applications, such as word processing applications and desktop publishing applications allow users to use pre-defined templates (templates) to prepare new templates. For example, a template may be provided by a word processing application for preparing a resume template, and the template may have placeholders or text boxes for receiving certain types and amounts of information such as a user's personal data and employment history. Another example template may be provided by a desktop publishing application for preparing a newsletter, and the template may have placeholders or text boxes for headlines, pictures, stories, etc. Often users add or edit content to or in a first or starting template, but later decide to copy the content added to or edited in the first template to a different template. For example, a user may add content to or edit content in a newspaper-style template having placeholders for content arranged in long, narrow columns. Later, the user may desire to map the content from the newspaper-style template to a newsletter-style template having placeholders for content arranged according to a different structure.

Some prior systems require users to copy and paste content (piece-by-piece) from a starting template into a target template. Other prior systems allow for placeholders in different templates to be tagged for identification so that content from a starting template may be automatically copied to matching placeholders in a target template. However, such systems do not support user-inserted content (not conforming to a tagging scheme of the template) or content intended for one use that is inserted into a placeholder in a second template intended for another use, for example, story text entered into a headline placeholder in an article template.

Accordingly, there is a need for a method and system for improved mapping of content from a first or starting template to a target template. It is with respect to these and other considerations that the present invention has been made.

SUMMARY OF THE INVENTION

Embodiments of the present invention solve the above and other problems by providing methods and systems for mapping content from a starting template or document to a target template or document. According to an aspect of the invention, a first or starting template is received having one or more content placeholders and having user-inserted content in one or more of the content placeholders. A second or target template is received having one or more content placeholders. Upon an instruction or decision to populate the target template with user-inserted content from the starting template, the content placeholders and any user-inserted content are analyzed for both the starting and target templates to determine the nature of the content placeholders and user-inserted content associated with each template. A list of possible content mappings between the content of the starting template and the content placeholders of the target template is generated. An optimal content mapping is determined from the list of content mappings. After the optimal content mapping is determined, content from the starting template is mapped to the target template.

According to other aspects of the invention, analysis of the starting and target templates includes generation and analysis of a content schematic for each template. The content schematic includes a list of object properties that includes data associated with each content object and content placeholder contained in each template. For example, object properties may include the length of a text selection, the font size of a text selection, the size of an image, the location of a content object or placeholder, and the like. The content schematic also includes a proximity graph that represents physical arrangement of objects (content and placeholders) in the templates, for example, including whether one object is adjacent to or nearby another object in a given template. The content schematic also includes a relationship tree that illustrates the contextual relationships between objects, for example, whether a given caption is related to a given image.

Generation of the list of mappings includes analysis of the components of the content schematics to determine potential mappings of content objects from the starting template to placeholders in the target template that best fit the nature of and physical and contextual relationships between content objects and placeholders contained in the starting template. The optimal content mapping is determined by scoring each of the potential mappings based on how closely each potential mapping to the target template approximates the starting template. The content mapping with the best score is selected for final mapping of content from the starting template to the target template.

If one or more content objects may not be mapped to the target template, for example, where the target template does not contain sufficient space for one or more content objects from the starting template, the one or more content objects may be stored. A user interface may be provided to a user of the templates to allow the user to manually insert all or a portion of the one or more content objects into the target template as desired.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for mapping content from a first or starting template to a second or target template. According to embodiments of the present invention, an analysis is performed of any content objects and content placeholders contained in the starting and target templates. One or more potential content mappings are generated for potentially mapping content objects from the starting template to the target template. An optimal mapping is selected from the potential mappings, and content objects from the starting template are mapped to the target template according to the selected optimal mapping.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
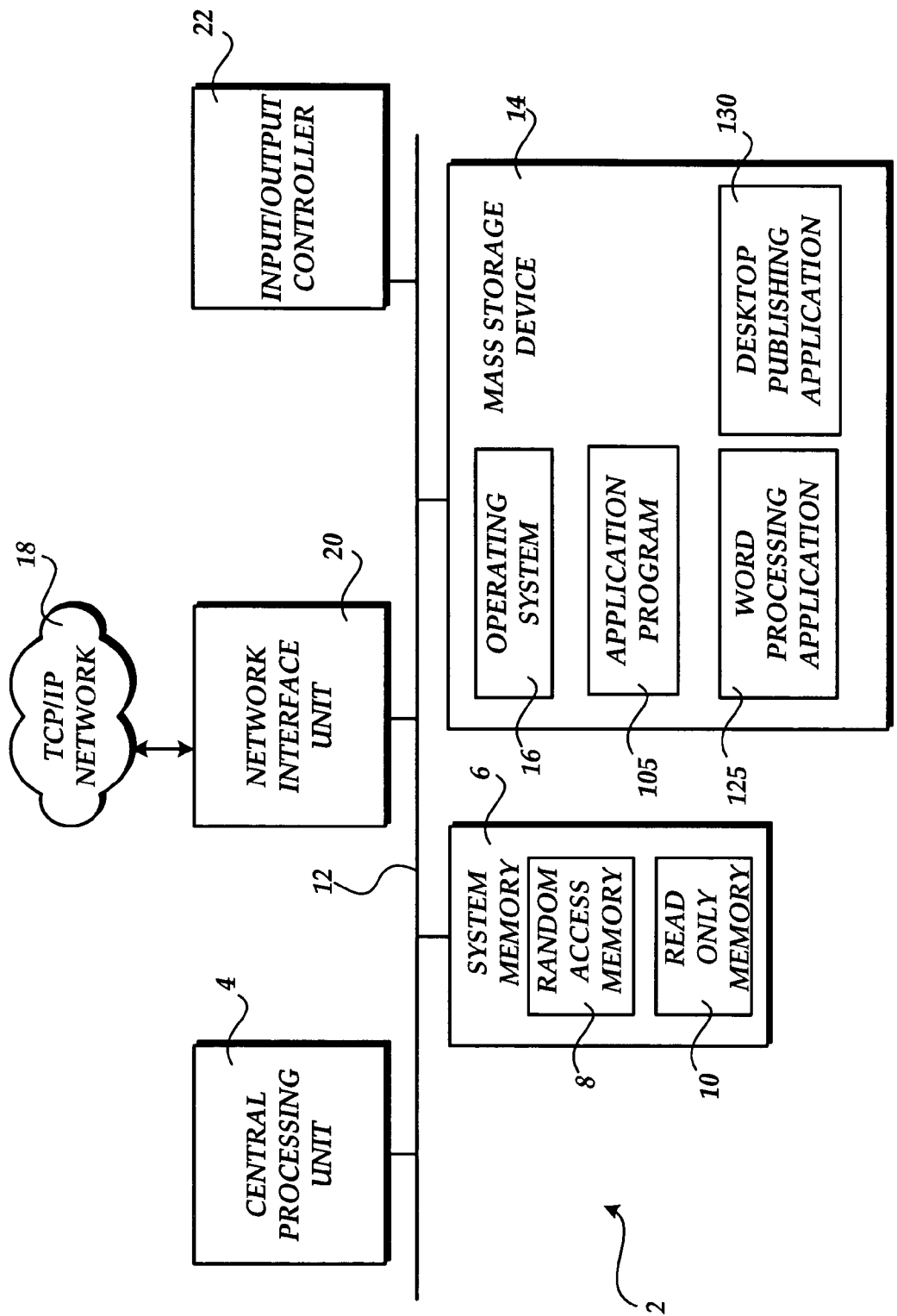
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, a desktop publishing application, a database application and the like.

According to an embodiment of the present invention, the word processing application 125 and the desktop publishing application 130 contain sufficient computer-executable instructions for mapping content from a starting document template to a target document template as described below. An example word processing application 125 for use in accordance with the present invention is WORD manufactured by Microsoft Corporation. An example desktop publishing application 130 for use in accordance with the present invention is PUBLISHER manufactured by Microsoft Corporation. As should be appreciated, the present invention may be operated by a variety of different software applications capable of creating and displaying documents with content placeholders for receiving user-inserted or mapped content.

Figure 2:
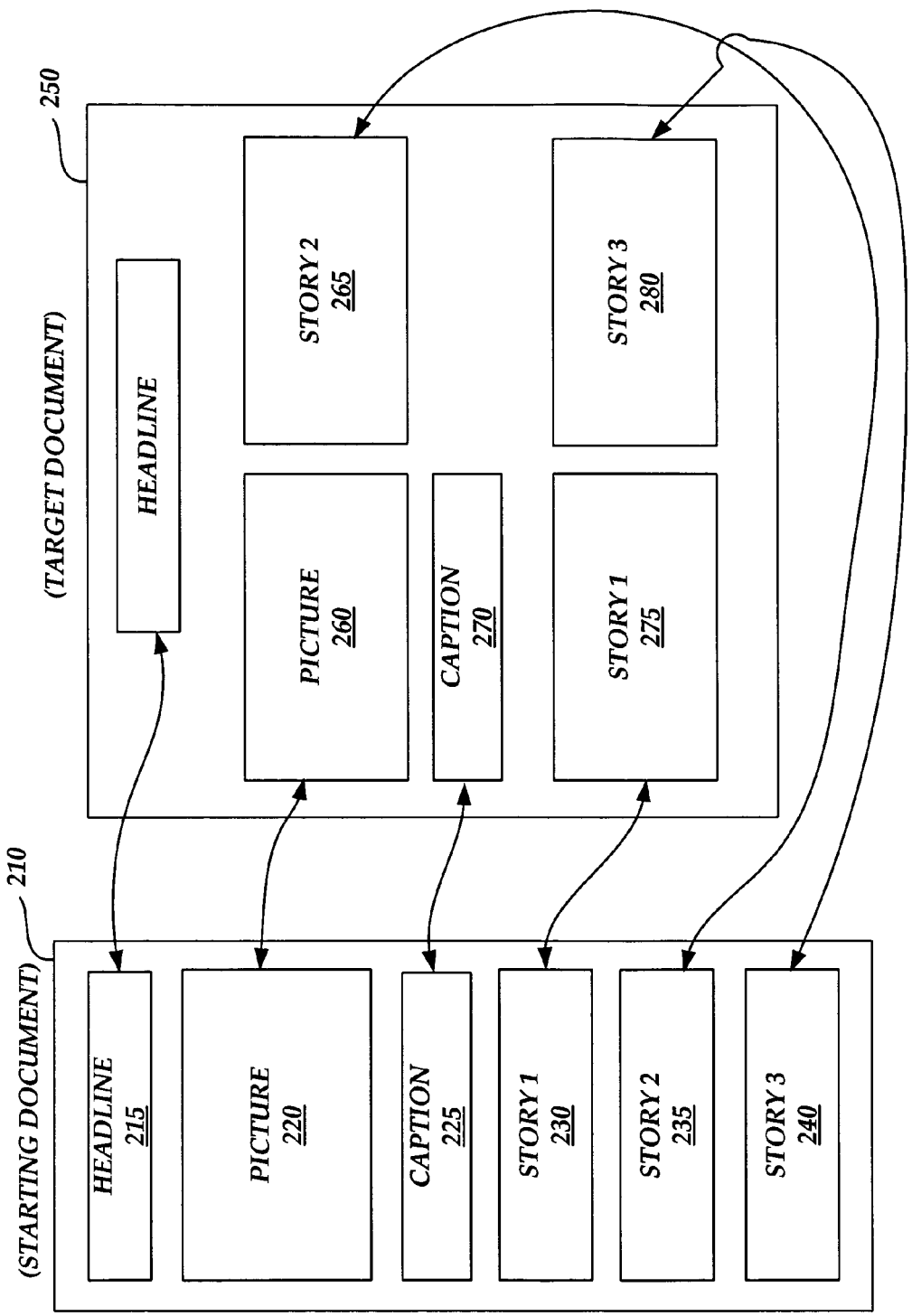
FIG. 2 is a simplified block diagram illustrating the mapping of content objects and content placeholders from a starting template to content placeholders of a target template.

FIG. 2 is a simplified block diagram illustrating the mapping of content objects from a starting template to content placeholders of a target template. The starting template 210 is illustrative of a first template from which user-inserted content is automatically mapped according to embodiments of the present invention into a second or target template 250. The term template is used herein to indicate a computer-generated document into which a user may insert content (text, images, data, etc.) and with which the user may edit content and content placeholders. Content placeholders refer to portions of the template/document pre-defined and/or pre-formatted for receiving content (e.g., text boxes). Content placeholders may have applied properties such as text fonts, text/image size limitations, and the like.

As described in detail below, according to embodiments of the present invention, when a user desires to map and populate user-inserted content from a starting template 210 into a different target template 250, an analysis of each of the two templates is performed, and an optimal content mapping is determined for mapping user-inserted content from the starting template 210 into the target template 250. For purposes of example only, embodiments of the present invention are described herein in terms of mapping user-inserted content from a newspaper column template 210 to a newsletter template 250. It should be understood to those skilled in the art that embodiments of the present invention may be utilized for mapping a variety of content objects from any number of starting templates to any number of target templates as described herein.

The starting template 210 may be prepared by a number of software applications including a word processing application, a desktop publishing application, and the like. An exemplary word processing application for preparing the starting template 210 and the target template 250, illustrated in FIG. 2, is WORD, manufactured by Microsoft Corporation, Redmond, Wash. An exemplary desktop publishing application for preparing the templates 210, 250, illustrated in FIG. 2, includes PUBLISHER manufactured by Microsoft Corporation of Redmond, Wash. According to embodiments of the present invention, the starting template 210 and the target template 250 may comprise document templates created by a user, or downloaded by a user from a template library provided by the user's word processing or desktop publishing application.

Referring to the starting template 210, a first content placeholder 215 is illustrated having user-inserted text. For example, the user-inserted text may include a headline for a newspaper article. A second content placeholder 220 is illustrated for containing a picture or image. A third content placeholder 225 is illustrated beneath the picture placeholder 220 for containing a caption. Content placeholders 230, 235, 240 positioned, respectively, underneath the caption placeholder 225 are illustrated for containing user-entered text, for example, stories for a newspaper column. As should be understood by those skilled in the art, the particular content placeholders and user-inserted text or images illustrated in FIG. 2 are for purposes of example only and are not limiting of the invention as claimed herein.

The target template 250 illustrates the mapping of user-inserted content from the starting template 210 into content placeholders contained in the target template 250. For example, as illustrated in FIG. 2, a first content placeholder 255 in the target template 250 receives content from the content placeholder 215 of the starting template 210. The content placeholder 260 in the target template 255 receives content mapped from the content placeholder 220 in the starting template. A third content placeholder 270 of the target template receives content mapped from the content placeholder 225 of the starting template, and so on. As will be described in detail below, a user desiring to map content entered into a starting template, for example a newspaper column-style template, over to a target template, for example a newsletter-style template, may automatically map user-inserted content from the starting template to the target template without the need to copy and paste content from individual placeholders in the starting template to corresponding placeholders in the target template.

Figure 3:
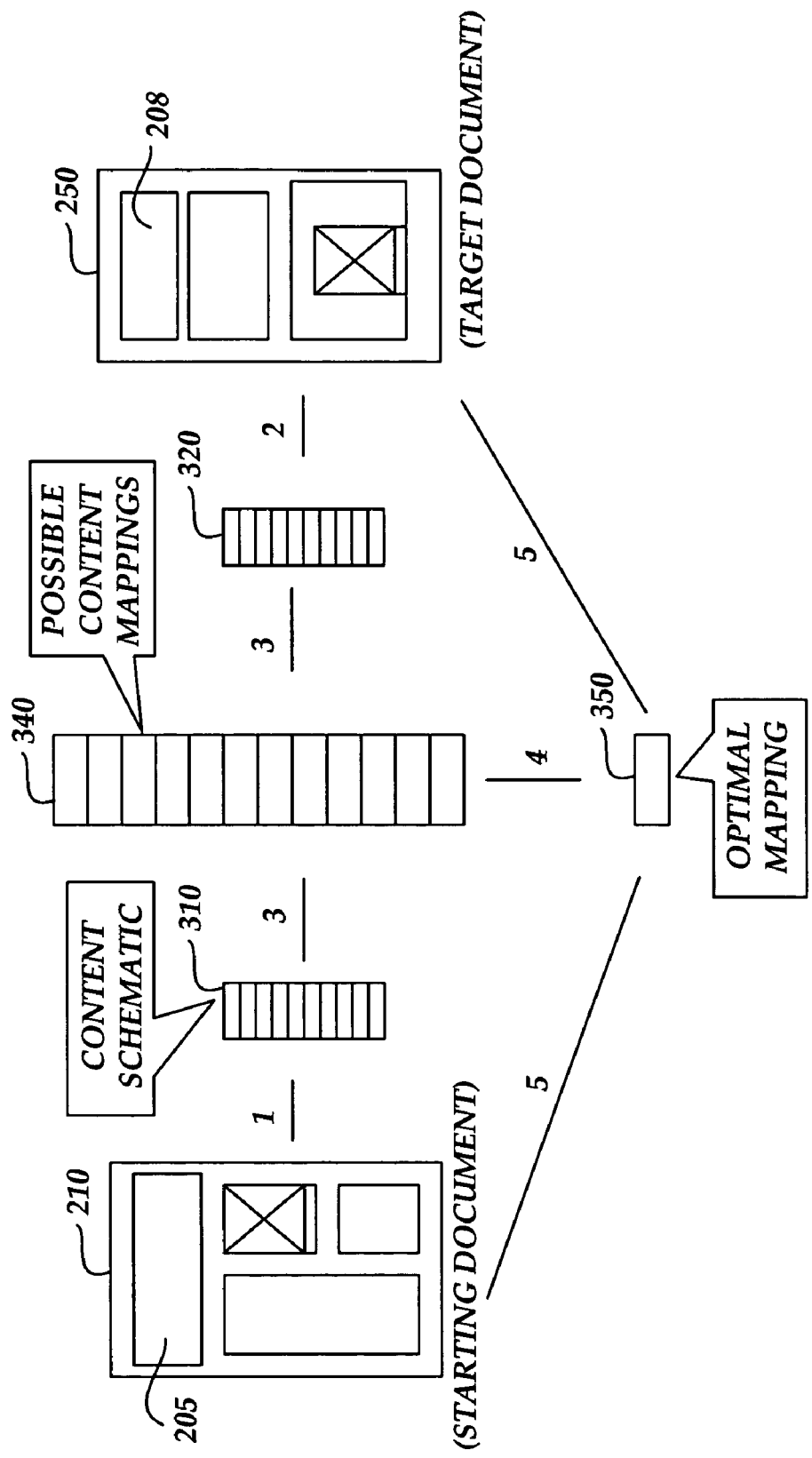
FIG. 3 is a simplified block diagram illustrating the mapping of content objects from a starting template to content placeholders of a target template.

FIG. 3 is a simplified block diagram illustrating a process of mapping content objects from a starting template to content placeholders of a target template according to embodiments of the present invention. When a user of a starting template 210, having content placeholders 205 and associated user-inserted content, desires to have the content mapped to a target template 250 having content placeholders 208, an analysis of both the starting template 205 and the target template 250 is performed to create a content schematic 310 for the starting template 205 and a content schematic 320 for the target template 250. As described below with reference to FIG. 4, the content schematics 310, 320 for each of the starting and target templates 210, 250 include information about each of the separate templates from which one or more possible content mappings 340 may be prepared. By analysis of each of the starting and target templates to determine the nature of content contained therein, the physical relationships between individual content objects contained therein, and any contextual relationships between individual content objects contained therein (for example, a caption displayed underneath an associated picture), one or more potential content mappings may be prepared for mapping content from the starting template to the target template 250.

As described below, each potential content mapping is scored based on how well the content is mapped from the first or starting template to the second or target template according to the given content mapping. The content mapping having the best mapping score is selected as an optimal mapping 350. Content from the starting template 210 is then mapped to the target template 250 according to the selected optimal mapping 350.

Figure 4:
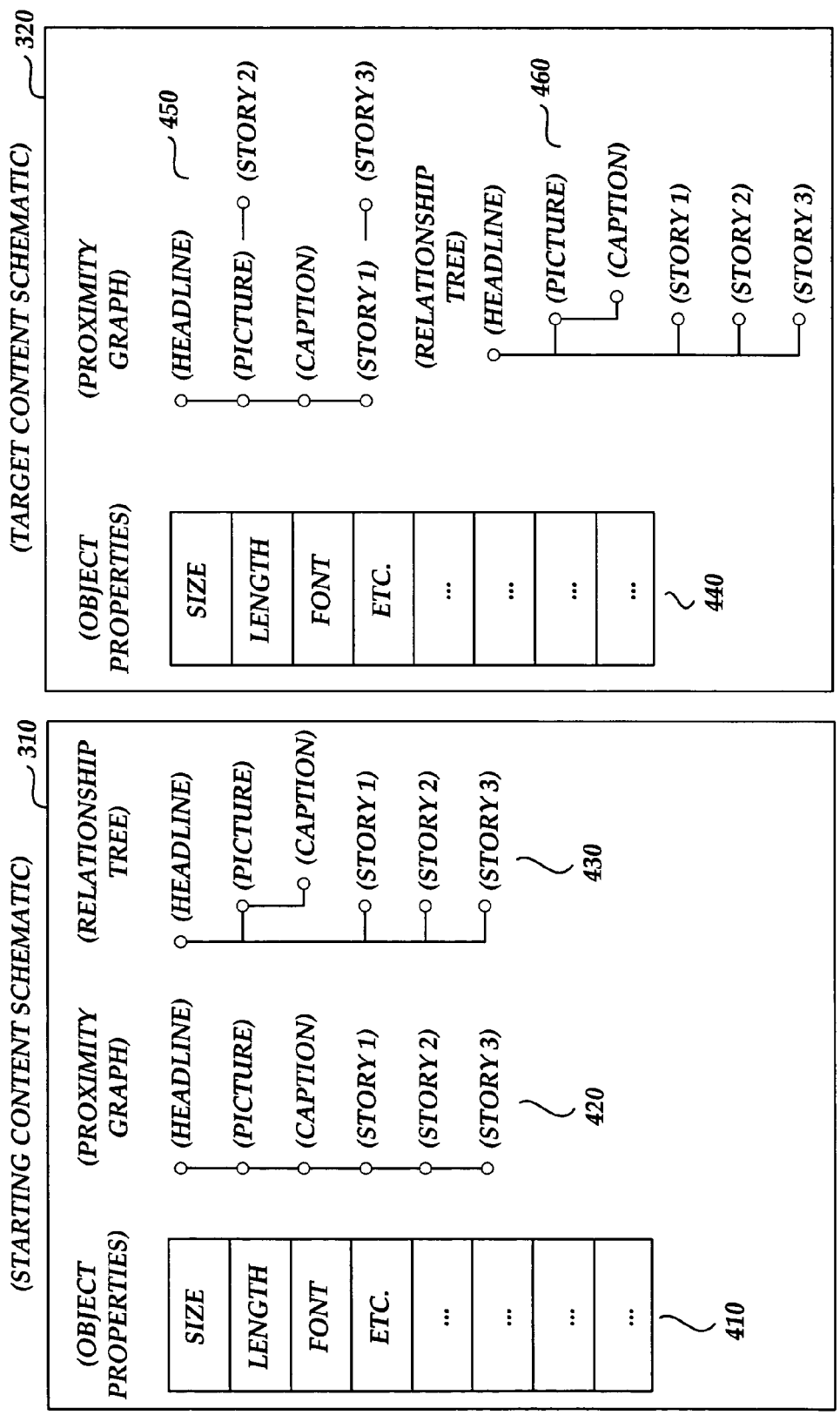
FIG. 4 is a simplified block diagram illustrating content schematics for starting and target templates for mapping content between a starting template and a target template according to embodiments of the present invention.

FIG. 4 is a simplified block diagram illustrating content schematics for starting and target templates according to embodiments of the present invention. As described above with reference to FIG. 3, during the analysis of each of the first and second templates 210, 250 for generation of one or more potential mappings of content from the first template to content placeholders in the second template, a content schematic is constructed for each of the first and second templates. Each of the content schematics 310, 320 for the starting template 210 and target template 250 includes a list of object properties 410, 440, a proximity graph 420, 450 and a relationship tree 430, 460.

The list of object properties 410, 440 prepared for the content schematics for each of the two templates includes information regarding individual content objects or content placeholders contained in each of the templates. For example, for a given content object, such as a text selection entered by a user, the list of object properties may include the size of the text selection, the length of the text selection, the font with which the text selection is entered and displayed, a location range within the template for the text selection, and the like. Other object properties include special formatting properties applied to the content object including formatting associated with computing languages such as the Extensible Markup Language. For any content placeholders in either of the two templates, which do not contain any user-inserted content, the list of object properties may nonetheless contain information such as predefined font properties associated with the content placeholders, size limitations associated with text or images that may be inserted into the placeholders, and the like.

The proximity graphs 420, 450 generated for each of the starting and target templates 210, 250 represent the physical relationships between content objects or content placeholders included in the respective templates. For example, referring to the proximity graph 420, and referring to the starting template 210, illustrated in FIG. 2, the proximity graph 420 illustrates that each of the content placeholders 215-240 and the associated user-inserted content are physically positioned in a vertical orientation with each successive content placeholder positioned below the immediately preceding content placeholder. Referring to the proximity graph 450 for the target template 250, the proximity graph illustrates that the placeholder 260 is positioned beneath the placeholder 255 and that the placeholder 265 is positioned to the right of the placeholder 260. Additionally, the proximity graph 450 illustrates that the content placeholder 270 is positioned beneath the placeholder 260 and that the placeholders 275 and 280 are positioned in side-by-side orientation beneath the placeholder 270.

Referring still to FIG. 4, the relationship trees 430, 460 for the content schematics 310, 320 illustrate functional and/or contextual relationships between content objects and/or content placeholders in the respective templates 210, 250. As illustrated in FIG. 2, the headline placeholder 215 for the starting template 210 is a parent of the picture placeholder 220 and the story placeholders 230, 235, 240. The caption placeholder 225 is illustrated as having a child relationship to the picture placeholder 220. The illustrated relationship between the picture placeholder 220 and the caption placeholder 225 indicates that the caption placeholder 225 belongs with the picture placeholder 220. As described below, during the generation of potential mappings of content from the first template to the second template, the relationship between the parent picture placeholder 220 and the child caption placeholder 225 will be maintained, if possible, when associated data is mapped to the second template according to embodiments of the present invention.

The relationship tree 460 for the target template shows a same relationship between content objects in the target template as the relationship tree 430 shows for the starting template. However, as should be understood by those skilled in the art, if the target template 250 does not contain content and/or content placeholders corresponding to content and/or content placeholders contained in the starting template, the relationship tree 460 for the target template may be significantly different than the relationship tree 430 for the starting template. For example, if the target template 250 does not have a placeholder 270 into which content from the caption placeholder may be mapped, the relationship tree 460 may not show a node for the caption placeholder as a child of the picture placeholder.

After the content schematics for each of the starting and target templates are prepared, one or more potential mappings are generated. In a first instance, an attempt is made to match content objects from the starting template 210 to content placeholders in the target template 250 based on object properties associated with individual content objects and listed in the list of object properties 410, 440. For example, a text object is mapped to a text placeholder, an image object is mapped to an image placeholder, and so on. Using other object properties, a content object of a certain size may be mapped to a content placeholder of a similar size. If a content object is entered according to a specific font, it may be mapped to a content placeholder formatted with the same font.

After utilization of the object properties for the content objects and content placeholders for each of the templates, the proximity graphs 420, 450 may next be used for generating the potential mappings. For example, if a particular content object (e.g., the picture object 220) is positioned immediately beneath another particular content object (e.g., the headline object 215), an attempt is made to map the two content objects to placeholders in the target template such that the physical relationship is maintained.

Next, the relationship trees 430, 460 for each of the two templates may be used to determine optimal mapping of content objects from the starting template to the target template. For example if both the picture object 220 and the associated caption object 225 in the starting template are to be mapped to the target template, then an attempt is made to maintain the contextual relationship (parent/child) between those content objects as shown in the relationship tree 430. Otherwise, an undesirable result may be reached where a caption prepared for a picture is mapped to a location in the target template unrelated to the associated picture.

Once the list of potential mappings is prepared based on the information generated and stored in the content schematics, a cost analysis or scoring (optimization analysis) of the individual potential mappings is performed. The higher the score or the lower the cost, the more likely the mapping is an optimal mapping. For example, a mapping that fails to map one or more content objects from the starting template to the target template may receive a low score or high cost. For another example, a mapping that fails to maintain a contextual relationship (e.g., caption with picture) may receive a medium score or cost. For another example, a mapping that maps all content and maintains proximity and contextual relationships between content objects, but places a content object in an oversized content placeholder may receive a relatively high score or low cost. Thus, as the optimization process is performed, the mapping with the high score or low cost will be selected as the optimal mapping.

Figure 5:
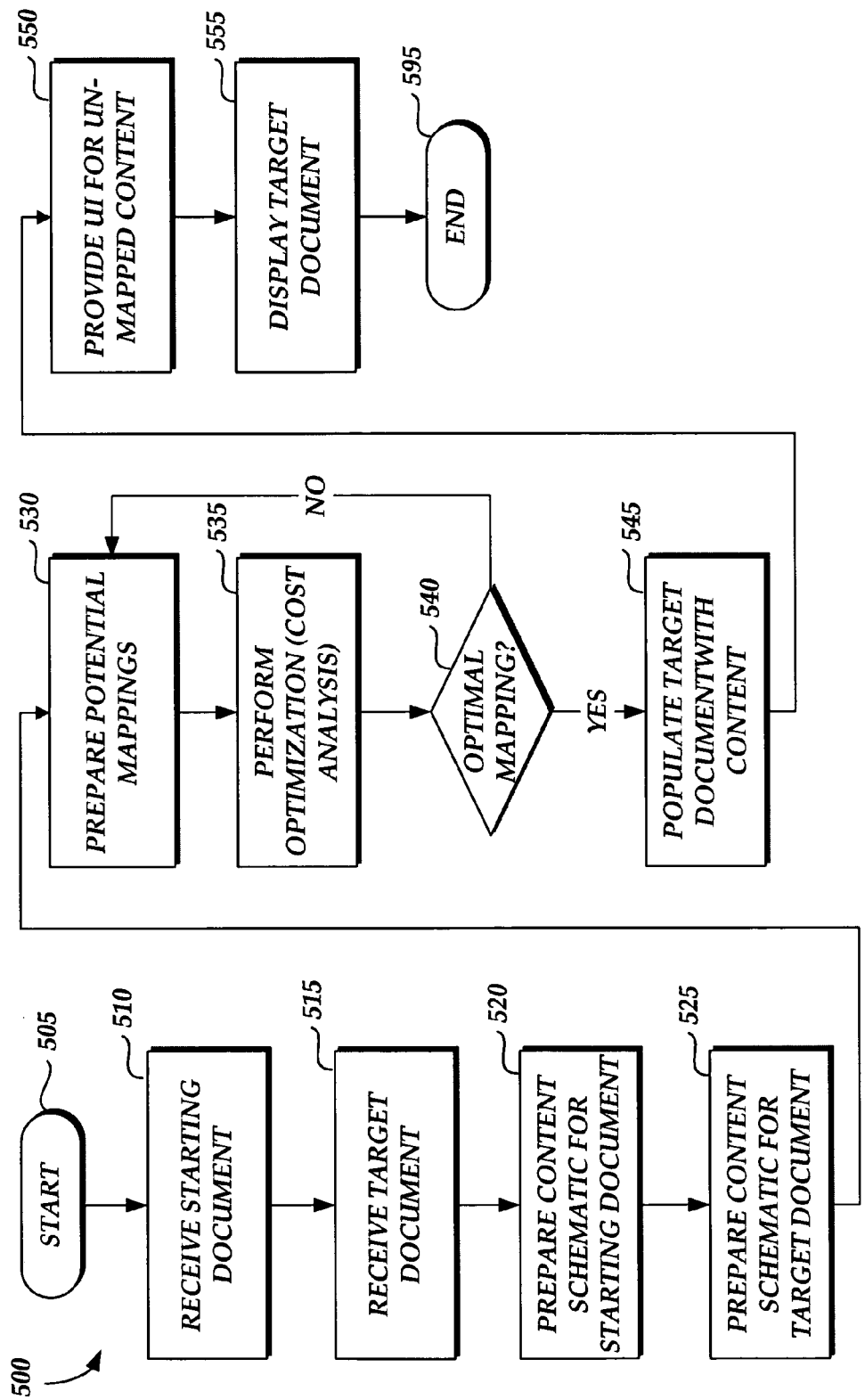
FIG. 5 is a flow diagram showing an illustrative routine for mapping content from a starting template to content placeholders in a target template according to embodiments of the present invention.

Having described an exemplary operating environment and components of the present invention above, it is advantageous to describe embodiments of the present invention below in terms of an example operation of the invention. For purposes of example, operation of embodiments of the present invention will be described in terms of the example starting template and the example target template illustrated in FIG. 2. FIG. 5 is a flow diagram showing an illustrative routine for mapping content from a starting template to content placeholders in a target template according to embodiments of the present invention. The routine 500 begins at start block 505 and proceeds to block 510 where a starting template is received. As should be understood by those skilled in the art, the starting template may be a document template 210, as illustrated in FIG. 2, in which a user has inserted a variety of content objects such as text selections, images, captions, data and the like. The template 210 may include one or more content placeholders for insertion of the content objects by the user.

At block 515, a target template is selected for mapping content objects from the starting template into the target template. As described above, the target template may be a template having one or more placeholders for receiving content objects, or the target template may be a document template that has been previously populated with user-inserted text or images. Mapping content objects from the starting template to the target template in this case may have the effect of writing text or images from the starting template over certain content objects already populated into respective content placeholders contained in the target template.

At block 520, the software application responsible for preparation of the starting and target templates, for example a word processing application or desktop publishing application, prepares a content schematic for the starting template 210. At block 525, the software application prepares a content schematic for the target template 250. As described above with reference to FIGS. 3 and 4, preparation of the content schematics for the starting and target templates includes preparation of a list of object properties for each of the two templates, preparation of proximity graphs for each of the two templates, and preparation of relationship trees for each of the two templates.

At block 530, the software application prepares one or more potential mappings of content objects from the starting template 210 to the target template 250. As described above with reference to FIGS. 3 and 4, the one or more potential mappings prepared at block 530 may include different mappings of content objects from the starting template to the target template including different arrangements of content objects in the target template. At block 535, an optimization analysis of the potential mappings is performed to determine an optimal mapping from the starting template to the target template. As described above with reference to FIG. 4, each potential mapping may be scored to determine how well a given mapping approximates the original mapping of content objects in the starting template. At block 540, if an optimal mapping is determined, the routine proceeds to block 545, and content objects from the starting template 210 are populated into the target template 250 according to the determined optimal mapping.

Alternatively, the generation of and optimization analysis of potential mappings may be an iterative process. That is, at block 530, a first potential mapping may be generated followed by an optimization analysis of the first potential mapping. If the optimization analysis results in a low score or high cost associated with the potential mapping, as described above with reference FIG. 4, the routine may proceed back to 530, and a different potential mapping may be generated where certain content objects may be shifted to different positions in the potential mapping, or certain content objects may be added while other content objects are omitted. An optimization analysis is then performed on the second potential mapping to determine whether an optimal mapping has been reached. As should be understood by those skilled in the art, the iterative process may be performed for a set number of iterations, or the iterative process may run for a defined period of time followed by a selection of the potential mapping with the highest score or lowest cost prepared during the iterative process. Each potential mapping generated may be stored in a data structure of potential mappings so that the optimal potential mapping may be selected at the conclusion of the iterative optimization process.

Returning back to block 545, as described above, once an optimal mapping from the starting template 210 to the target template is determined, the content objects, such as user-inserted text, images, and the like, are populated into the target template 250 according to the determined optimal mapping. If one or more content objects are not mapped to the target template 250, those content objects may be stored for subsequent use. At block 550, a user interface may be provided to the user to alert the user as to any content objects that have not been mapped to the target template 250 and to allow the user to manually edit the target template 250 to insert one or more of those content objects into the target template. For example, if the target template 250 is not large enough to receive all content objects from the starting template 210, certain content objects may not be mapped to the target template 250. Once the user learns of those content objects that have not been mapped to the target template 250, the user may decide that a preferable content mapping will include insertion of one of the omitted content objects in place of one of the mapped content objects. At block 555, the target template 250 is displayed for review by the user. Once the target template is displayed, the user may then edit the target template according to the functionality of the software application utilized by the user for preparation of the target template 250.

Figure 6:
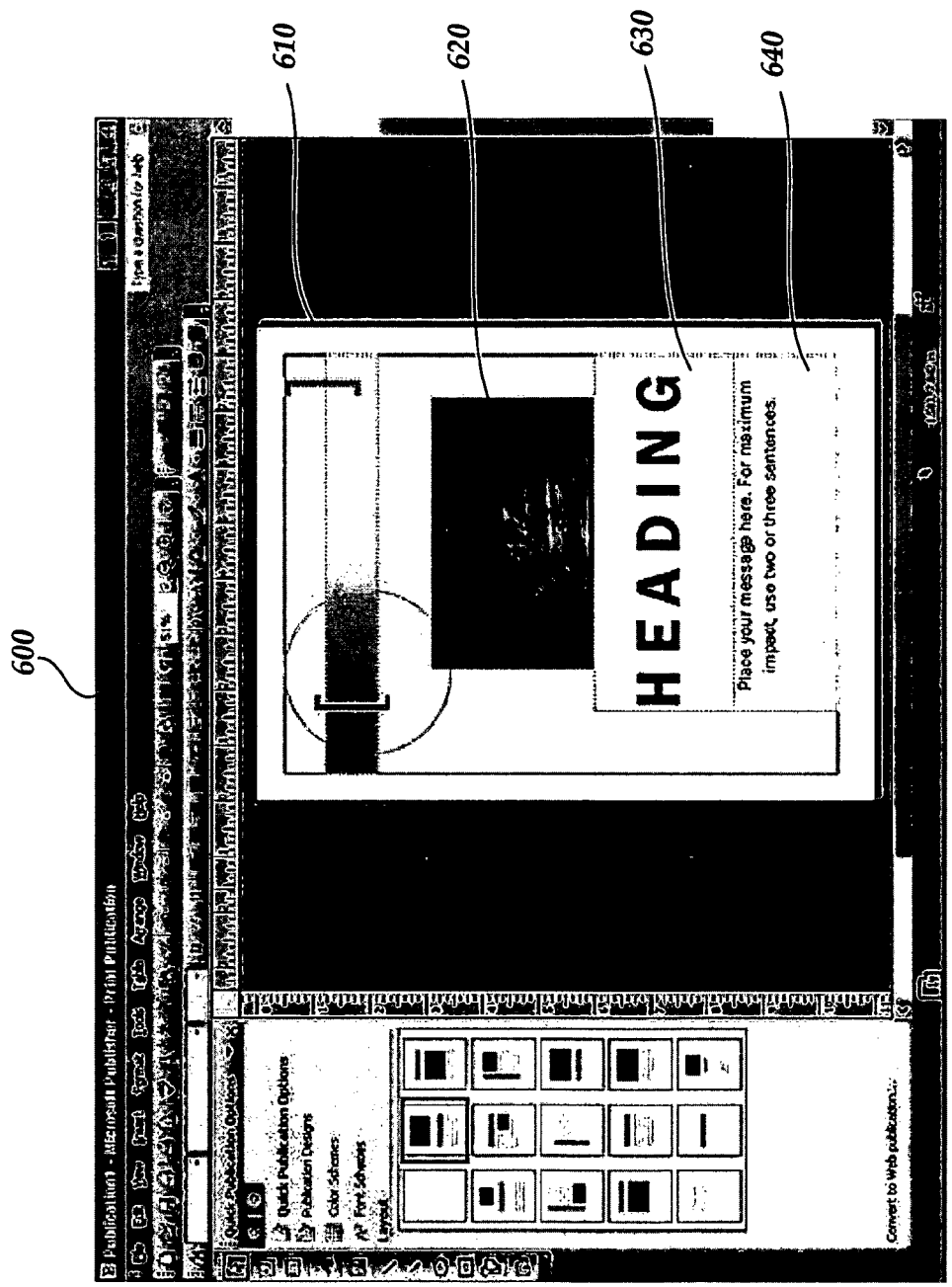
FIGS. 6 and 7 illustrate computer screen shots showing mapping of content from a starting template to a target template according to an actual implementation of an embodiment of the present invention.
Figure 7:
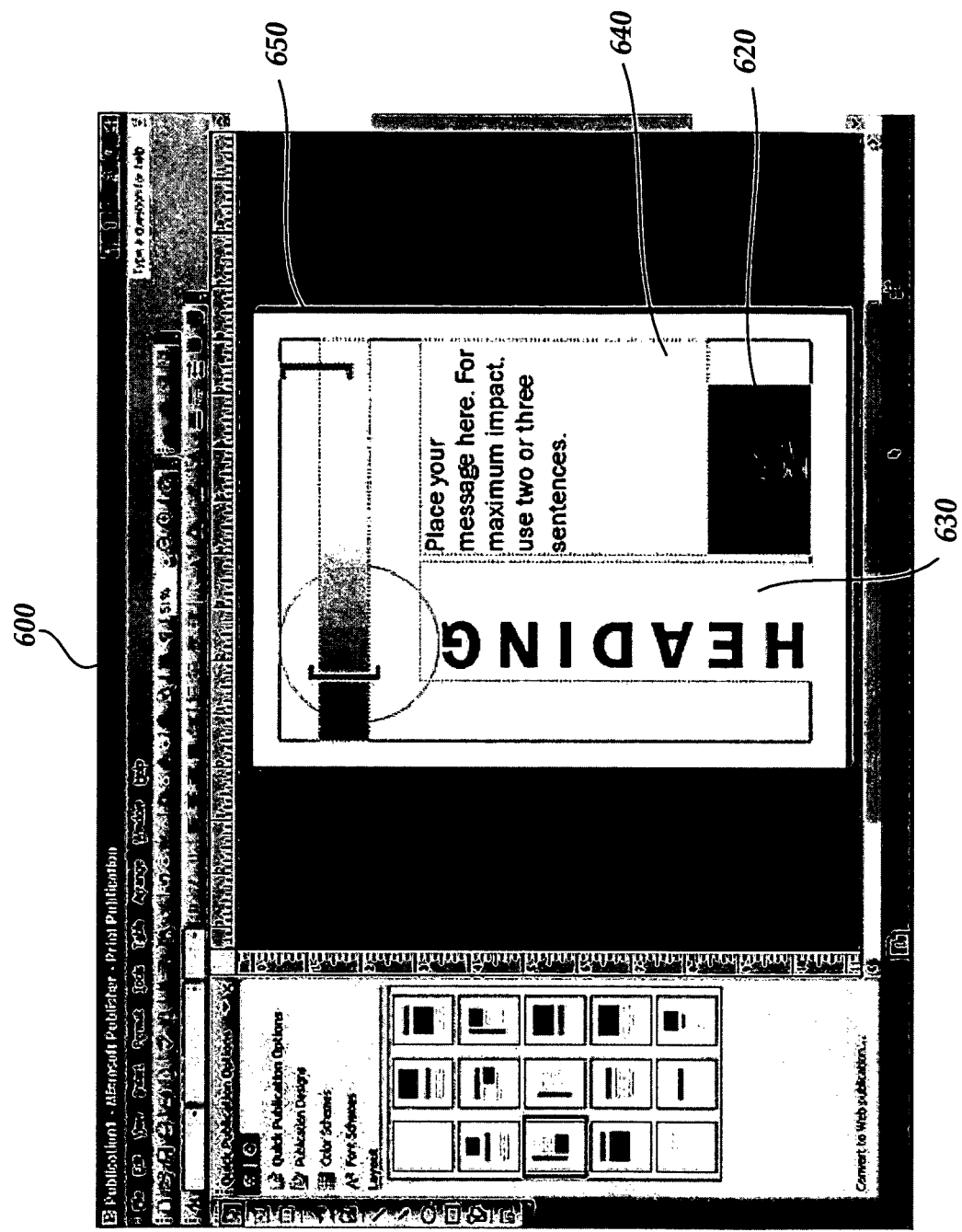

Having described an example operation of the invention with reference to FIG. 5 above, FIGS. 6 and 7 illustrate computer screen shots showing mapping of content from a starting template to a target template according to an actual implementation of an embodiment of the present invention. Referring to FIG. 6, the user interface 600 is illustrative of a user interface provided by a desktop publishing application for preparing a variety of documents. An example brochure document 610 is representative of a template into which content objects have been entered. An image object 620, a heading object 630 and a text object 640 have each been entered into the document 610 as illustrated. Referring to FIG. 7, a user has selected a second or target document template from the user's desktop publishing application, and the content objects 620, 630, 640 have been mapped to the target document 650 as described above with reference to FIG. 5. As shown in FIG. 7, the content objects have all been mapped to the target document, but the arrangement of the objects is different from the arrangement of the same objects in the starting document 610. After the content objects are mapped to the target document 650, the user may then edit the target document 650, as desired.

As described herein, improved methods and systems are provided for mapping content from a starting template into a target template. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method of mapping content from a structured starting template to a pre-generated structured target template comprising:

providing, by a computer, the structured starting template in an application for a document and the pre-generated structured target template in the application for the document, wherein the starting template and the pre-generated target template are configured for the same display media, the starting template and the pre-generated target template transform a document layout of the document of the application to another document layout for the document of the application by:

analyzing, by a computer, the starting template to determine when content objects are associated with the starting template;

determining, by a computer, object properties associated with the content objects that are associated with the starting template;

determining, by a computer, physical relationships between the content objects that are associated with the starting template, the physical relationships are represented by a proximity graph having the physical relationships of the content objects that are associated with the starting template;

determining, by a computer, contextual relationships between the content objects that are associated with the starting template, the contextual relationships between the content objects that are associated with the starting template are represented by a relationship tree;

analyzing, by a computer, the pre-generated target template to determine when content placeholders are associated with the pre-generated target template;

determining, by a computer, object properties associated with the content placeholders that are associated with the pre-generated target template;

determining, by a computer, physical relationships between the content placeholders that are associated with the pre-generated target template, the physical relationships are represented by a proximity graph having the physical relationships of the content objects that are associated with the pre-generated target template;

determining, by a computer, contextual relationships between the content placeholders that are associated with the pre-generated target template, the contextual relationships between the content objects that are associated with the pre-generated target template are represented by a relationship tree;

generating, by a computer, potential content mappings from the starting template to the pre-generated target template for mapping the content objects that are associated with the starting template to the content placeholders that are associated with the pre-generated target template based on the object properties, the proximity graphs of the starting template and the pre-generated target template, and the relationship trees of the starting template and the pre-generated target template;

rating, by a computer, the potential content mappings according to rating factors, the rating factors are based on maintaining the object properties associated with the content placeholders to the object properties associated with the content objects, the physical relationships associated with the content placeholders to the physical relationships associated with the content objects, and the contextual relationships associated with the content placeholders to the contextual relationships associated with the content objects;

determining, by a computer, which content mapping is an optimal content mapping for mapping the content objects associated with the starting template to the content placeholders associated with the pre-generated target template, the optimal content mapping being the highest rated content mapping according to the rating factors;

selecting, by a computer, the optimal content mapping;

mapping, by a computer, the content objects that are associated with the starting template to the content placeholders that are associated with the pre-generated target template according to the optimal content mapping selected from the content mappings; and displaying, by a computer, the pre-generated target template after mapping the content objects that are associated with the starting template to the content placeholders that are associated with the pre-generated target template according to the optimal content mapping selected from the content mappings.

2. The computer-implemented method of claim 1, wherein the optimal content mapping includes a content mapping wherein the content objects of the starting template are mapped to corresponding content placeholders of the pre-generated target template having object properties that most closely approximates object properties associated with the content objects of the starting template.

3. The computer-implemented method of claim 1, wherein the optimal content mapping includes the content mapping that maps content objects from the starting template to content placeholders in the pre-generated target template such that the physical relationships between content objects in the starting template are most closely maintained when the content objects are mapped to the pre-generated target template.

4. The computer-implemented method of claim 1, wherein the optimal content mapping includes the content mapping that maps content objects from the starting template to content placeholders in the pre-generated target template such that the contextual relationships between content objects in the starting template are most closely maintained when the content objects are mapped to the pre-generated target template.

5. The computer-implemented method of claim 1, further comprising storing content objects not mapped to the pre-generated target template, and providing a user interface for manually inserting the content objects not mapped to the pre-generated target template into the pre-generated target template.

6. A computer-readable storage medium having computer executable instructions for mapping content from a structured starting template to a pre-generated structured target template, the instructions comprising:

providing, by a computer, the structured starting template in an application for a document and the pre-generated structured target template in the application for the document, wherein the starting template and the pre-generated target template are configured for the same display media, the starting template and the pre-generated target template transform a document layout of the document of the application to another document layout for the document of the application by:

analyzing, by a computer, the starting template to determine when content objects are associated with the starting template;

determining, by a computer, object properties associated with the content objects that are associated with the starting template;

determining, by a computer, physical relationships between the content objects that are associated with the starting template, the physical relationships are represented by a proximity graph having the physical relationships of the content objects that are associated with the starting template;

determining, by a computer, contextual relationships between the content objects that are associated with the starting template, the contextual relationships between the content objects that are associated with the starting template are represented by a relationship tree;

analyzing, by a computer, the pre-generated target template to determine when content placeholders are associated with the pre-generated target template;

determining, by a computer, object properties associated with the content placeholders that are associated with the pre-generated target template;

determining, by a computer, physical relationships between the content placeholders that are associated with the pre-generated target template, the physical relationships are represented by a proximity graph having the physical relationships of the content objects that are associated with the pre-generated target template;

determining, by a computer, contextual relationships between the content placeholders that are associated with the pre-generated target template, the contextual relationships between the content objects that are associated with the pre-generated target template are represented by a relationship tree;

generating, by a computer, potential content mappings from the starting template to the pre-generated target template for mapping the content objects that are associated with the starting template to the content placeholders that are associated with the pre-generated target template based on the object properties, the proximity graphs of the starting template and the pre-generated target template, and the relationship trees of the starting template and the pre-generated target template;

rating, by a computer, the potential content mappings according to rating factors, the rating factors are based on maintaining the object properties associated with the content placeholders to the object properties associated with the content objects, the physical relationships associated with the content placeholders to the physical relationships associated with the content objects, and the contextual relationships associated with the content placeholders to the contextual relationships associated with the content objects;

determining, by a computer, which content mapping is an optimal content mapping for mapping the content objects associated with the starting template to the content placeholders associated with the pre-generated target template, the optimal content mapping being the highest rated content mapping according to the rating factors;

selecting, by a computer, the optimal content mapping;

mapping, by a computer, the content objects that are associated with the starting template to the content placeholders that are associated with the pre-generated target template according to the optimal content mapping selected from the content mappings; and displaying, by a computer, the pre-generated target template after mapping the content objects that are associated with the starting template to the content placeholders that are associated with the pre-generated target template according to the optimal content mapping selected from the content mappings.

7. The computer-readable storage medium of claim 6, wherein the optimal content mapping includes a content mapping wherein the content objects of the starting template are mapped to corresponding content placeholders of the pre-generated target template having object properties that most closely approximates object properties associated with the content objects of the starting template.

8. The computer-readable storage medium of claim 6, wherein the optimal content mapping includes the content mapping that maps content objects from the starting template to content placeholders in the pre-generated target template such that the physical relationships between content objects in the starting template are most closely maintained when the content objects are mapped to the pre-generated target template.

9. The computer-readable storage medium of claim 6, wherein the optimal content mapping includes the content mapping that maps content objects from the starting template to content placeholders in the pre-generated target template such that the contextual relationships between content objects in the starting template are most closely maintained when the content objects are mapped to the pre-generated target template.

10. The computer-readable storage medium of claim 6, further comprising storing content objects not mapped to the pre-generated target template, and providing a user interface for manually inserting the content objects not mapped to the pre-generated target template into the pre-generated target template.

11. A system for mapping content from a structured starting template to a pre-generated structured target template, the system comprising:

a processor; and a memory having computer executable instructions stored thereon, the computer executable instructions comprising:

providing the structured starting template in an application for a document and the pre-generated structured target template in the application for the document, wherein the starting template and the pre-generated target template are configured for the same display media, the starting template and the pre-generated target template transform a document layout of the document of the application to another document layout for the document of the application by:

analyzing the starting template to determine when content objects are associated with the starting template;

determining object properties associated with the content objects that are associated with the starting template;

determining physical relationships between the content objects that are associated with the starting template, the physical relationships are represented by a proximity graph having the physical relationships of the content objects that are associated with the starting template;

determining contextual relationships between the content objects that are associated with the starting template, the contextual relationships between the content objects that are associated with the starting template are represented by a relationship tree;

analyzing the pre-generated target template to determine when content placeholders are associated with the pre-generated target template;

determining object properties associated with the content placeholders that are associated with the pre-generated target template;

determining physical relationships between the content placeholders that are associated with the pre-generated target template, the physical relationships are represented by a proximity graph having the physical relationships of the content objects that are associated with the pre-generated target template;

determining contextual relationships between the content placeholders that are associated with the pre-generated target template, the contextual relationships between the content objects that are associated with the pre-generated target template are represented by a relationship tree;

generating potential content mappings from the starting template to the pre-generated target template for mapping the content objects that are associated with the starting template to the content placeholders that are associated with the pre-generated target template based on the object properties, the proximity graphs of the starting template and the pre-generated target template, and the relationship trees of the starting template and the pre-generated target template;

rating the potential content mappings according to rating factors, the rating factors are based on maintaining the object properties associated with the content placeholders to the object properties associated with the content objects, the physical relationships associated with the content placeholders to the physical relationships associated with the content objects, and the contextual relationships associated with the content placeholders to the contextual relationships associated with the content objects;

determining which content mapping is an optimal content mapping for mapping the content objects associated with the starting template to the content placeholders associated with the pre-generated target template, the optimal content mapping being the highest rated content mapping according to the rating factors;

selecting the optimal content mapping;

mapping the content objects that are associated with the starting template to the content placeholders that are associated with the pre-generated target template according to the optimal content mapping selected from the content mappings; and displaying the pre-generated target template after mapping the content objects that are associated with the starting template to the content placeholders that are associated with the pre-generated target template according to the optimal content mapping selected from the content mappings.

12. The system of claim 11, wherein the optimal content mapping includes a content mapping wherein the content objects of the starting template are mapped to corresponding content placeholders of the pre-generated target template having object properties that most closely approximates object properties associated with the content objects of the starting template.

13. The system of claim 11, wherein the optimal content mapping includes the content mapping that maps content objects from the starting template to content placeholders in the pre-generated target template such that the physical relationships between content objects in the starting template are most closely maintained when the content objects are mapped to the pre-generated target template.

14. The system of claim 11, wherein the optimal content mapping includes the content mapping that maps content objects from the starting template to content placeholders in the pre-generated target template such that the contextual relationships between content objects in the starting template are most closely maintained when the content objects are mapped to the pre-generated target template.

15. The system of claim 11, further comprising storing content objects not mapped to the pre-generated target template, and providing a user interface for manually inserting the content objects not mapped to the pre-generated target template into the pre-generated target template.

* * * * *

UNITED STATES PATENT AND TRADEMARK OFFICE
CERTIFICATE OF CORRECTION

| | | |
|---|---|---|
| PATENT NO. | : 7,617,449 B2 | Page 1 of 1 |
| APPLICATION NO. | : 10/857607 | |
| DATED | : November 10, 2009 | |
| INVENTOR(S) | : John Thomas Carlson et al. | |

It is certified that error appears in the above-identified patent and that said Letters Patent is hereby corrected as shown below:

In column 11, line 62, in Claim 1, after "template," insert -- wherein --.

Signed and Sealed this
Fifteenth Day of February, 2011

David J. Kappos
*Director of the United States Patent and Trademark Office*